June 28, 1927.  J. J. CARTER  1,633,922

MANUFACTURE OF COMMUTATORS

Filed May 21, 1925

Inventor
John J. Carter
By Spencer Sewall & Hardman
his Attorneys.

Patented June 28, 1927.

1,633,922

UNITED STATES PATENT OFFICE.

JOHN J. CARTER, OF LANSING, MICHIGAN, ASSIGNOR, BY MESNE ASSIGNMENTS, TO DELCO-REMY CORPORATION, OF DAYTON, OHIO, A CORPORATION OF DELAWARE.

MANUFACTURE OF COMMUTATORS.

Application filed May 21, 1925. Serial No. 31,960.

This invention relates to commutators for dynamo electric machines and particularly to machines of relatively small size such as electric motors for operating automobile horns.

One of the objects of the invetnion is to provide a new method of manufacture and apparatus for carrying out the method by which the cost of making commutators may be reduced.

Further objects and advantages of the present invention will be apparent from the following description, reference being had to the accompanying drawings, wherein a preferred form of embodiment of the present invention is clearly shown.

Figures 1, 2:
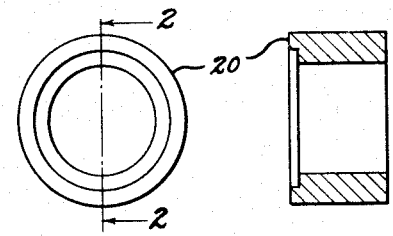
Fig. 1 is an end view of a tube of metal used to manufacture the commutator in accordance with present invention.
Fig. 2 is a sectional view on the line 2—2 of Fig. 1.
Figure 5:
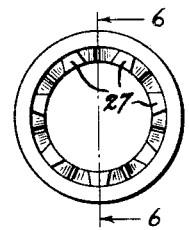
Fig. 5 is a view of one end of the tube of metal after being operated upon as shown in Figs. 3 and 4.
Figures 6, 7:
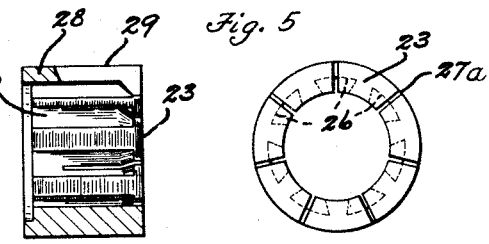
Fig. 6 is a sectional view on the line 6—6 of Fig. 5.
Fig. 7 is a view of the other end of the tube.

A section 20 of tubing of ductile metal such as copper is placed in a die member 21 having a cylindrical recess 22 for receiving the exterior side wall and one end wall 23 of the tube 20. During the squeezing action to be described the cylindrical inner wall of the tube 20 is retained by a mandrel 24 located centrally of the recess 22. The mandrel 24 is provided with a plurality of equidistant, longitudinally extending, metal deforming members 25. Each member 25 is dove-tailed in cross section so as to form a similarly shaped groove in the metal tube. Relative movement is produced between the members 21 and 24 until the grooved members 25 have progressed into the tube 20 as far as shown in Fig. 4. Then the mandrel 24 is retracted from the die 21 and the tube 20 is removed. The operation shown in Figs. 3 and 4 changes the shape of the tube 20 from that shown in Figs. 1 and 2 to that shown in Figs. 5, 6 and 7. The members 25 have squeezed certain portions of the metal adjacent the central wall of the tube in order to provide a plurality of equally spaced, longitudinally extending grooves 26 which define tangs 27, dove-tail shape in cross section. The grooves 26 extend from one end of the tube but terminate short of the end 23. Therefore the portion of the tube at the end 23 is the same in radial thickness.

Figure 3:
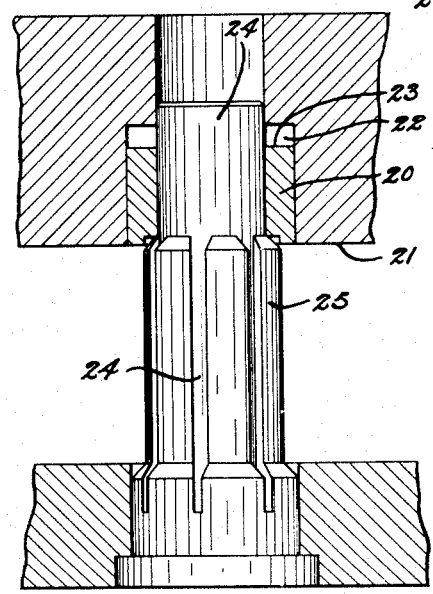
Figs. 3 and 4 are sectional views showing the die members for operating upon the tube of metal shown in Figs. 1 and 2, Fig. 3 showing the beginning of the operation and Fig. 4 the completion.
Figure 8:
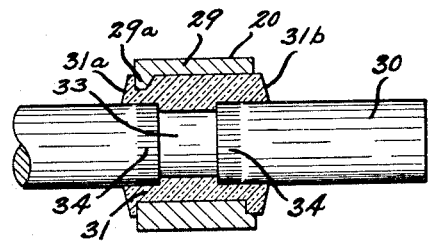
Fig. 8 is a sectional view of the commutator tube secured to a central core or shaft by a molded insulating material.
Figure 4:
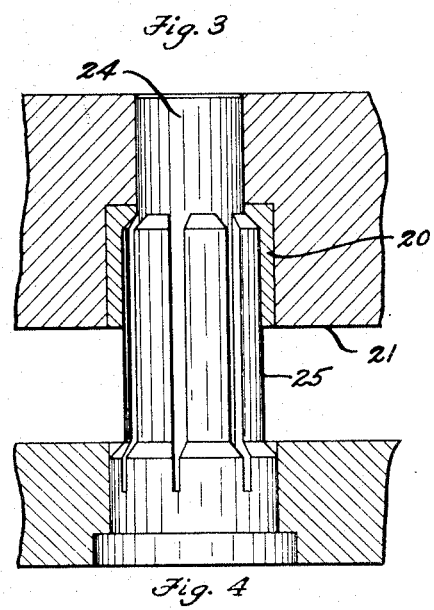
Figure 9:
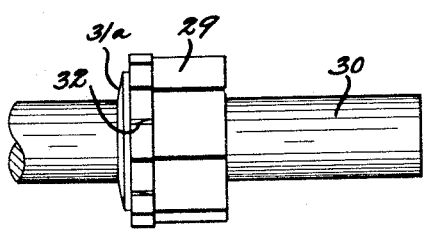
Fig. 9 is a side view of the completed commutator.

After the tube 20 has been removed from the forming member shown in Figs. 3 and 4 it is divided longitudinally by a plurality of slots 27ᵃ. Each slot 27ᵃ extends through the end portion 23 and stops short of the opposite end in order to provide a ring portion 28 which joins the segments 29 which are defined by the slots 27ᵃ.

The tube is placed in a mold and a core or shaft 20 is located centrally thereof. The tube and shaft are permanently joined by a body of molded insulating material 31 which is tamped into the mold between the shaft 30 and the tube 20 and is hardened under heat and pressure. The insulating material 31 fills the spaces between the tangs 27 and portions of the material indicated at 31ᵃ and 31ᵇ are molded against the ends of the tube.

After the molding operation is completed the ring portion 28 of the tube which is left after forming the slots 27ᵃ is removed thus leaving a commutator comprising a plurality of metal segments 29 each having a longitudinal tang 27 embedded in the body of insulating material 31.

Each segment 29 is prevented from moving longitudinally with respect to the insulating material 31 since its flange 29ᵃ, formed from the end face 23, is embedded in the insulating body 31. Each segment cannot move laterally because the tang 27 is likewise embedded in the insulating material. The body of insulating material is prevented from moving endwise since a portion of it is molded into a groove 33 provided by the core or shaft 30. The insulating body 31 cannot rotate with respect to the shaft 30 since a portion of it is molded into a knurled portion 34 of the shaft 30.

Each segment 29 is provided with a slot 32 for receiving the end of an armature conductor.

One of the important advantages of the present invention is that the amount of waste of the commutator metal has been reduced to the minimum. The pieces 20 are cut from drawn copper tubing or other material. The metal which is displaced to form the grooves 26 flows into other portions of the tube in order to increase its length from that shown in Figs. 2 and 3 to that shown in Fig. 4. This increase in length of the tube is substantially equal to the width of the ring portion 28, which holds the commutator segments during the molding operation.

While the form of embodiment of the present invention as herein disclosed, constitutes a preferred form, it is to be understood that other forms might be adopted, all coming within the scope of the claims which follow.

What is claimed is as follows:

1. The method of manufacture of commutators which includes shaping a cylindrical tube of ductile metal having a cylindrical bore into a tube having a plurality of spaced, longitudinally extending tangs by means of suitable dies which cause sections of the metal of the tube to be forced out leaving spaces between the tang-forming portions of the tube, and which cause the metal forced out to flow into other portions of the tube in order to add to the length thereof, slotting the tube through a greater portion of its length so as to provide segments of equal width, held together by the unslotted end portion of the tube, securely joining the tube to a metal core, located centrally of the tube, by a molded insulating material, and then removing the unslotted end of the tube.

2. The method of manufacture of commutators which includes supporting the inner and outer walls of a tube of ductile metal and also supporting one end of the tube while squeezing spaced longitudinal sections of the tube adjacent the interior thereof against the supported surfaces of the tube in order to provide a plurality of spaced, longitudinally extending dove-tail cross-sectional tangs on the interior of the tube and to cause the displaced metal to flow into other parts of the tube and increase the length thereof, slotting the tube through a greater portion of its length so as to provide segments of equal width, held together by the unslotted end portion of the tube, securely joining the tube to a metal core, located centrally of the tube, by a molded insulating material, and then removing the unslotted end of the tube.

3. Apparatus for making commutators comprising a die providing a cavity for supporting the outer wall and one end wall of a tube of ductile metal, a mandrel movable centrally through the die for supporting the inner wall of the tube, and a plurality of metal displacing members arranged about the mandrel and extending longitudinally in spaced relation in order to form dove-tail cross-sectional tangs upon the interior of the tube by displacing certain spaced sections of the tube and causing the displaced metal to flow into other portions of the tube to increase the length thereof, slotting the tube through a greater portion of its length so as to provide segments of equal width, held together by the unslotted end portion of the tube, securely joining the tube to a metal core, located centrally of the tube, by a molded insulating material, and then removing the unslotted end of the tube.

4. The method of making commutators which consists in providing a tube of ductile material having a cylindrical bore, forming dove-tail cross-sectional flanges in said tube and longitudinally thereof, by deforming spaced sections of the tube adjacent the inner periphery by applying pressure longitudinally of said tube and against spaced sections of one end thereof, slotting the tube through a greater portion of its length so as to provide segments of equal width held together by the unslotted end portion of the tube, securely joining the tube to a metal core, located centrally of the tube, by a molded insulating material, and removing the unslotted end of the tube.

5. The method of making commutators which consists in providing a tube of ductile material having a cylindrical bore, forming dove-tail cross-sectional flanges in said tube for the greater portion of its length and a circular flange at its one end by deforming spaced sections of the tube adjacent the inner periphery and for a greater portion of the length of the tube, slotting the tube from the end having the circular flange to within a spaced distance of the other end thereby forming a plurality of segments of equal width held together by the unslotted end of the tube, securely joining the tube to a metal core, located centrally of said tube, by a molded insulating material, and then removing the unslotted end of the tube.

In testimony whereof I hereto affix my signature.

JOHN J. CARTER.